April 14, 1953 — L. O. UPTON — 2,635,125
GLASS INDUCTION FURNACE
Filed Sept. 30, 1949 — 2 SHEETS—SHEET 1

INVENTOR.
LEE O. UPTON
BY
Louis L. Gagnon
ATTORNEY

April 14, 1953 L. O. UPTON 2,635,125
GLASS INDUCTION FURNACE
Filed Sept. 30, 1949 2 SHEETS—SHEET 2

INVENTOR.
LEE O. UPTON
BY
Louis L. Gagnon
ATTORNEY

Patented Apr. 14, 1953

2,635,125

UNITED STATES PATENT OFFICE 2,635,125

GLASS INDUCTION FURNACE

Lee O. Upton, Sturbridge, Mass., assignor to American Optical Company, Southbridge, Mass., a voluntary association of Massachusetts Application September 30, 1949, Serial No. 118,976

7 Claims. (Cl. 13—6)

This invention relates to furnaces and has particular reference to induction heating type furnaces used for glass melting.

It is a principal object of this invention to provide an induction type furnace for glass melting embodying a tubular secondary which is disposed within and inductively heated by the primary coils of a transformer, a pot containing a batch composition being located so as to be radiantly heated by the secondary which is completely encased in refractory material to lessen oxidation and to decrease the discharge of reaction products therefrom which are detrimental to the glass batch composition being melted, and an air circulatory system for permitting a controlled amount of air to circulate between the pot and internal wall of the heating unit.

Another object is to provide a furnace of the above character having means associated with the air circulatory system for introducing an atmosphere of inert or reactive gases as desired to provide reducing, oxidizing, neutral or other desired conditions.

Another object is to provide a furnace of the above character wherein by the proper control of power input a glass batch composition may be precision annealed either with or without inert and/or reactive atmospheres in the same furnace in which it was melted.

Another object is the provision of a furnace of the above character wherein the heat is more uniformly distributed and the temperature strictly controlled, which features provide superior conditions for melting simultaneously a plurality of glass batch compositions.

Still another object of this invention is the provision of glass melting furnaces of the above character which may be made to accommodate any size melt including small experimental melts or large production melts, and which are relatively compact in size and require less space than conventional gas furnaces of comparable capacity with extra space-consuming accessories such as piping and regenerative or recuperative air preheating devices.

Figure 1:
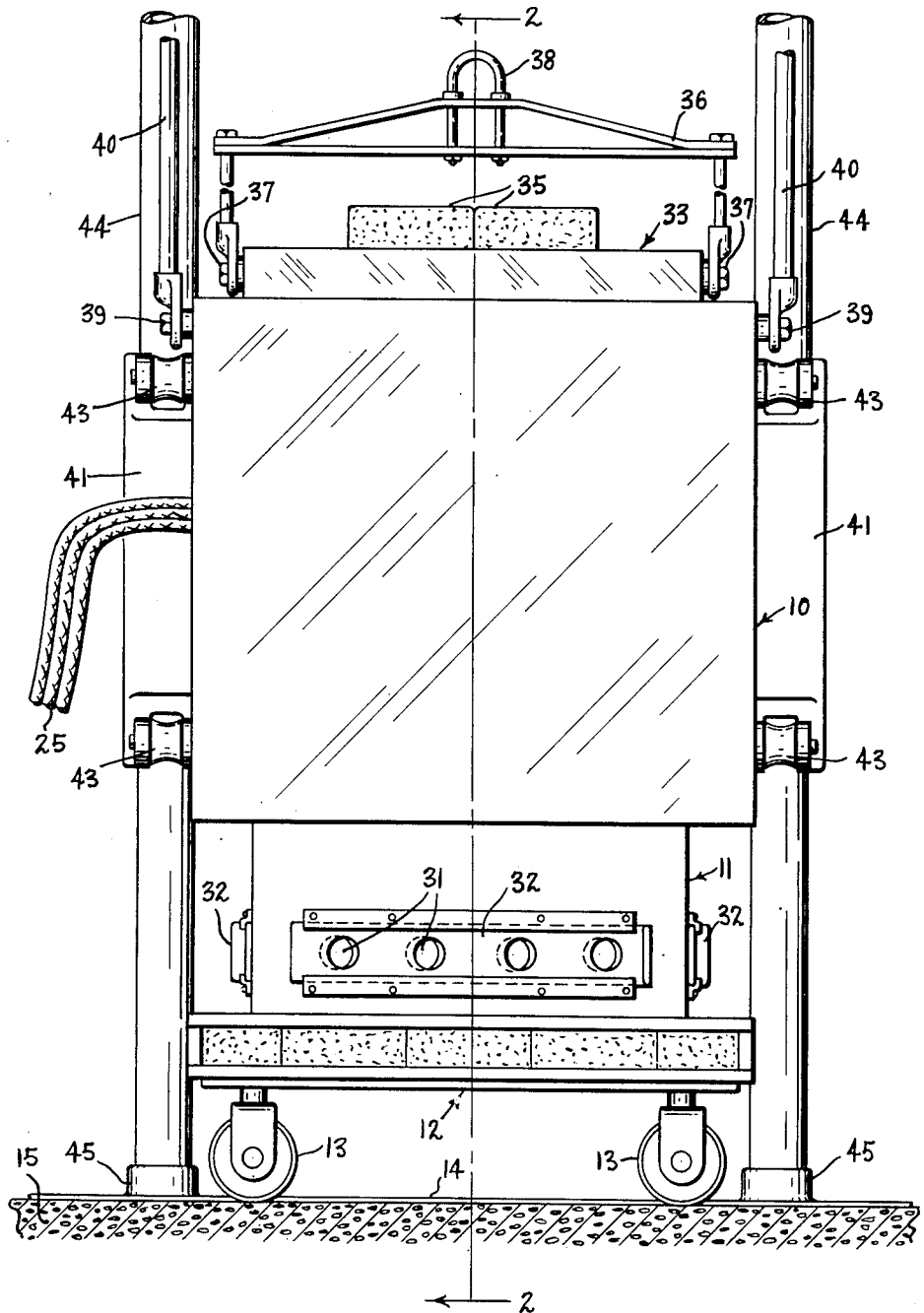
Figure 2:
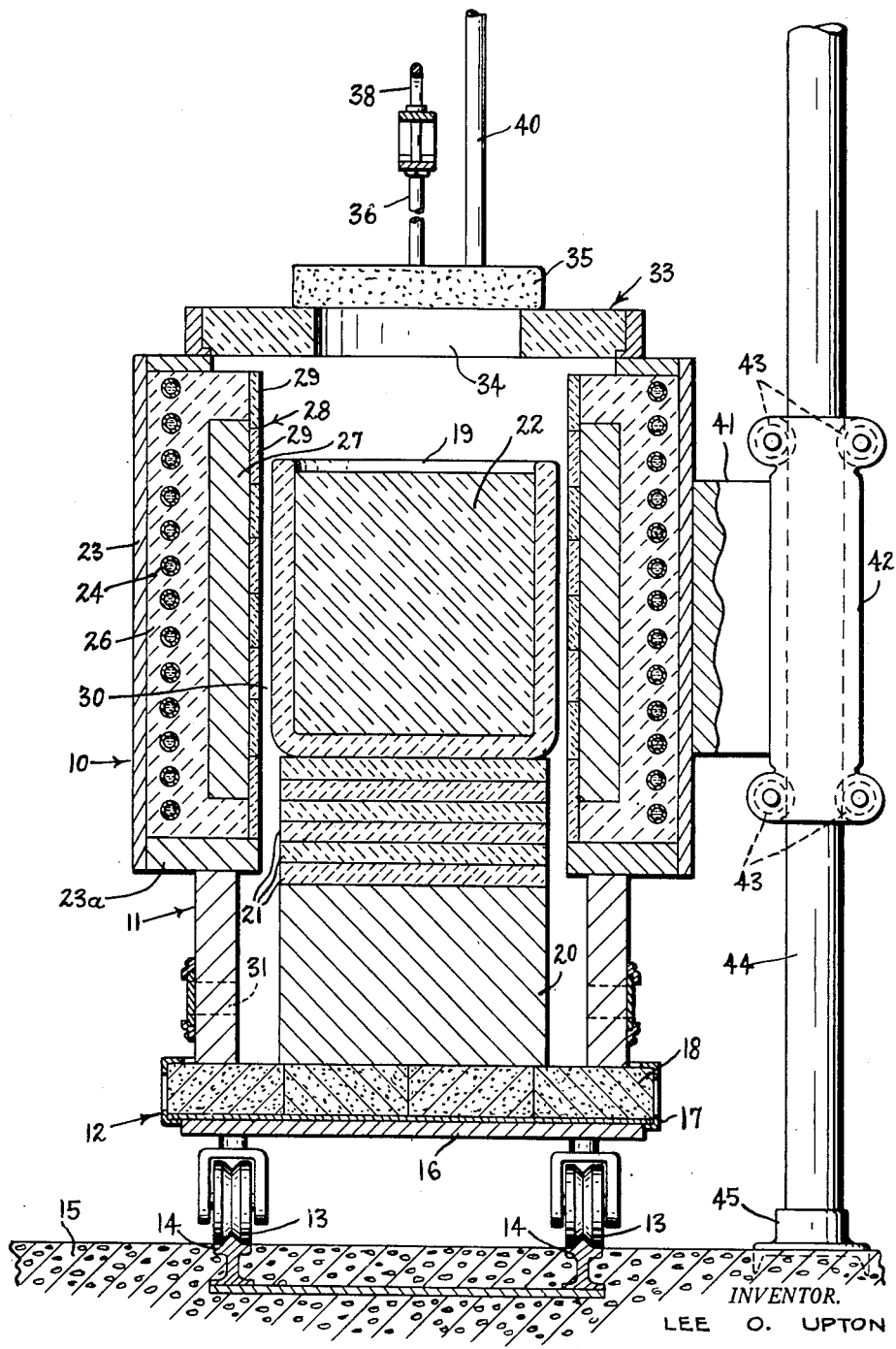

Other objects and advantages of the invention will become apparent from the following description taken in connection with the accompanying drawings, in which:

Fig. 1 is a front elevational view of a furnace constructed in accordance with the present invention; and Fig. 2 is a sectional view taken on line 2—2 of Fig. 1 approximately through the center of the furnace shown in Fig. 1.

Although gas fired, oil fired and electric furnaces or combination gas fired and electric furnaces are in common use in glass manufacturing, the use of induction type furnaces has not heretofore been practical principally because of the fact that unlike metal, glass compositions especially at ordinary temperatures are inherently non-conducting within the range of frequencies commercially available. However, the present invention overcomes this and other objections by providing a furnace for melting glass embodying a series of coils for inducing a large current in a rather poor conducting secondary which in turn radiantly heats the pot and glass composition therein.

Referring particularly to the drawings there is illustrated a furnace embodying mainly a heating device 10 supported by a supporting member 11 upon a truck 12 which is preferably mounted upon wheels 13 shaped to engage a pair of tracks 14 for movement of the furnace as desired along a floor designated as 15.

The truck 12 is of conventional type embodying a base 16 having a frame 17 carrying layers of brick 18 for supporting the furnace.

The supporting member 11 is adapted to be seated upon the brick base 18 and is formed of durable insulating material preferably of the type known as "Transite" which is a material made of cement and asbestos compressed into a body having exceptional durability and heat resistance characteristics. The heating device is supported by the member 11 and in assembled relation therewith forms the housing within which the refractory pot 19 is adapted to be placed.

The refractory pot 19 is preferably supported upon the truck 12 by a pier 20 of refractory or graphite material having a plurality of superimposed refractory slabs 21 disposed on the top thereof and on which the pot 19 is supported internally of the heating device 10. The slabs 21 are preferably formed of alumina but may be made of other suitable refractory material such as zirconia or thoria, and are used in plurality for the purpose of reducing thermal conduction losses downwardly and also of preventing breakage of the supporting pier as a unit by permitting individual expansion and contraction, thereby permitting replacement of one or more slabs upon breakage or contamination without requiring the replacement of the entire pier.

The refractory pot 19 contains the glass composition 22 which is to be melted by the heat of the heating device 10 which comprises a jacket 23 carried by a ring-like base 23a which is adapted to rest upon the supporting member 11. Within the jacket 23 there is provided a series of primary coils 24 which are tubular in shape and adapted to be electrically energized by suitable means through wiring 25 (Fig. 1). The primary coils 24 are themselves water cooled in the conventional manner and are completely embedded in a granular refractory insulating material 26 such as zirconia, alumina or the like.

A non-metallic secondary 27, preferably formed of graphite, carbon, carbonaceous material or carbides such as silicon carbide, aluminum carbide, boron carbide, or mixtures of silicates and carbonaceous materials, is supported within the primary coils 24 and spaced therefrom and insulated by the insulating material 26. The secondary 27 can be insulated by any suitable means such as by providing a refractory cement between the coils 24 for retaining the insulating material between the coils 24 and the secondary. It is particularly pointed out that the use of non-metallic materials such as those mentioned above is preferred for the reason that such materials used as the secondary when subjected to the high temperatures necessary for melting glass batch compositions do not react detrimentally with the protective surrounding refractory material which is the case with metallic materials which tend to chemically react unfavorably with the refractory material.

By energizing the coils 24 the secondary 27, which is in the magnetic field of the primary coils 24, will be inductively heated to the desired temperature. By the proper control of power input the temperature of the secondary 27 can be widely varied.

The secondary 27 will, upon being heated as described, radiantly heat the refractory pot 19 and glass composition 22 therein. However, with this arrangement alone it was found that during the cycle of heating the secondary 27 tends to discharge or throw off substantial amounts of carbon monoxide which are detrimental to the forming of a practical glass melt, with the additional disadvantage that the secondary oxidizes severely. Other materials such as metals, alloys, semi-metallics, and the like which would prove useful likewise suffer from oxidation at elevated temperatures.

Therefore, the present construction includes a liner 28 of suitable refractory material such as alumina, zirconia, or other inert refractory material which is placed inwardly of the secondary 27 and in close proximity thereto. The liner 28 can be in the form of a monolithic tubular member, segmented construction, or may comprise a plurality of ring-like segments stacked in end-to-end relation as indicated by numeral 29 in Fig. 2.

It is important to note here that care must be taken to insure that the granular insulating material 26 and liner 28 completely encase the secondary. By doing this the secondary 27 is protected from severe oxidation, thus considerably prolonging the life thereof, and the amount of carbon monoxide or reaction products thrown off from the secondary 27 is substantially decreased.

To provide means for overcoming the detrimental effect of what carbon monoxide does escape from a carbonaceous secondary 27, however, there is provided means for circulating oxygen or air with the carbon monoxide for reaction therewith to form carbon dioxide which is less detrimental to glass melt compositions. To provide this means the pier 20, slabs 21 and refractory pot 19 are so dimensioned with respect to the internal dimension of the heating device 10 as to allow a substantial air chamber therebetween, indicated by numeral 30 in Fig. 2, which permits a free flow of air between the pot 19 and liner 28.

To permit ingress of air and/or gases of other species to the air chamber 30 the supporting member 11 is provided with one or more vents 31 having a slidable damper 32 or like adjustable means thereover for controlling the amount of air permitted to enter the chamber 30. Thus, during a heating cycle a controlled amount of air will be permitted to enter the air chamber 30 through the vents 31 and flow upwardly to react with the carbon monoxide discharged from the carbonaceous secondary 27.

The heating device 10 is open at the top to permit intermittent additions to the batch composition 22 in the pot 19 during the melting cycle. However, the device is preferably provided with a cap or crown 33 made of refractory insulating material such as zirconia, alumina or other suitable refractory material and provided with a central opening 34 therein communicating with the interior of the furnace above the pot 19 for providing access to the pot 19 during the heating cycle for adding batch, observation and to permit stirring of the molten glass composition for homogenizing the glass. The opening 34 is covered by removable refractory bricks 35 which, during a melting cycle, will be spaced slightly to permit escape of volatile gas vapors from the interior of the furnace, and the bricks 35 and cap or crown 33 are preferably formed porous so as to permit ready escape of volatile gas vapors from the melt.

Suitable means such as a yoke 36 is pivotally connected as at 37 to the crown 33 and is provided with a substantially centrally disposed loop 38 to which a hoist can be connected for easily lifting the crown 33 off the heating device 10.

The heating device 10 is also provided with opposed connections 39 to which vertical rods 40 are pivotally connected, the rods 40 being suitably connected by conventional means not shown to lifting mechanism of any suitable kind for raising the heating device 10 off the supporting member 11. The heating device 10 is further provided with outwardly extending spaced arms 41 each having formed integral therewith a hollow casing 42 in the ends of which are located pairs of spaced roller bearings 43. Rigid vertical guide shafts 44 having their lower ends anchored to the floor by suitable retaining means 45 are adapted to extend through the casings 42 and to be engaged by the roller bearings 43 to guide the heating device 10 as it is vertically moved by hoisting mechanism off the supporting member 11.

Thus, the heating device 10 may be raised to permit a truck 12 carrying a supporting member 11 and a pier 20 having thereon a refractory pot 19 containing a glass composition 22 therein to be rolled into position whereby the heating device 10 can be lowered into proper encircling relation with the pot 19 for melting the composition 22, after which the device 10 can again be raised to permit an annealing shield to be placed around the pot or to permit removal of the truck 12 and articles carried thereupon.

It is particularly pointed out here that by constructing a glass melting furnace in accordance with this invention there will be many advantages over conventional glass melting furnaces. Heat is more uniformly distributed during the melting which provides superior conditions for simultaneously melting a plurality of small glass compositions if desired, rather than a single large batch. This provides greater ease in determining and maintaining the temperature of the melt.

Controlled atmospheres are provided in accordance with the construction of the furnace as described whereby air or gases of other species can be permitted to flow between the refractory pot and interior wall of the furnace. In this connection, it will be understood that by providing suitable petcocks adjacent the vents or other suitable locations various atmospheres can be provided such as for example by inserting nitrogen to give a neutral atmosphere, ammonia or carbon monoxide for a reducing atmosphere, and the like.

Another exceptionally beneficial feature is that by properly controlling the power input to the primary coils a glass melt can be precision annealed in the same furnace in which it was melted without necessitating transferral to a separate unit for such purpose.

It is also particularly pointed out that furnaces of this character may be made to accommodate any size melt and can be used to easily control the melting of glass compositions to prevent development of detrimental conditions incident with glass melting by conventional methods.

From the foregoing it will be seen that there is provided novel means of accomplishing all of the objects of the invention, and while the novel features of the invention have been described and are pointed out in the annexed claims, it will be understood that various omissions, substitutions and changes may be made in the forms and details described by those skilled in the art without departing from the spirit of the invention.

I claim:

1. A heating device of the character described comprising an open ended chamber having an outer wall, a series of electric primary induction coils for operatively creating a magnetic field disposed inwardly of said wall, a tubular secondary disposed inwardly of said primary coils and in said magnetic field and formed of a material capable of being heated inductively by said primary coils, a refractory insulating liner inwardly of said secondary and formed of refractory material from the group consisting of zirconia, alumina and thoria, said liner covering the interior surface thereof, insulating means of said refractory material between said primary coils and secondary and entirely covering the surfaces of the secondary not covered by said liner, and means for supporting material within said liner for radiant heating by said secondary comprising a pier and a refractory pot carried by said pier containing the material to be heated, said device having a space between said pot and pier and said liner communicating with the open end of the chamber and vent means adjacent the opposed end of the chamber and communicating with said space to permit a circulating system between the pot and the refractory liner of the chamber.

2. A heating device of the character described comprising a series of electric primary induction coils in cylindrical arrangement for operatively creating a magnetic field, a tubular secondary of graphite disposed within said cylindrical arrangement of primary coils and in said magnetic field so as to be capable of being heated inductively by said primary coils, a refractory insulating liner covering the interior surface of said secondary and comprised of a plurality of ring-like segments of refractory material from the group consisting of alumina, thoria and zirconia placed in end to end relation, insulating means of said refractory material between said primary coils and secondary and entirely covering the surfaces of the secondary not covered by said liner, and means for supporting material within said liner for radiant heating by said secondary comprising a pier of said refractory material and a refractory pot carried by said pier containing the glass composition to be heated, said device having an air space between the pot and pier and said liner communicating with vents disposed above and below said pot to permit circulation of air therebetween.

3. A heating device for a furnace having material supported by a refractory pot therein comprising a series of primary induction coils, a tubular secondary disposed within said primary coils and in the magnetic field thereof for inductive heating by said primary coils, a refractory insulating liner of zirconia covering the internal surface of the secondary, insulating means of said zirconia between said primary coils and secondary and entirely covering the portions of said secondary not covered by said liner, said secondary encircling said pot containing the material so as to radiantly heat said material and said pot being spaced from said secondary and liner sufficiently to form an air chamber therearound.

4. A heating device for a furnace having material supported by a refractory pot therein comprising a series of primary induction coils, a tubular secondary disposed within said primary coils and in the magnetic field thereof for inductive heating by said primary coils, a refractory insulating liner of thoria covering the internal surface of the secondary, insulating means of said thoria between said primary coils and secondary and entirely covering the portions of said secondary not covered by said liner, said secondary encircling said pot containing the material so as to radiantly heat said material, and said pot being spaced from said secondary and liner sufficiently to form an air chamber therearound for permitting introduction of gases to the furnace atmosphere.

5. A glass melt furnace of the character described comprising a support for a glass-batch-containing crucible, a heating chamber having vents adjacent the opposed ends thereof and being positioned in spaced relation about said crucible and support to form an air chamber between the inner wall of said heating chamber and the crucible and support, said air chamber communicating with said vents to provide a circulatory system of atmosphere between the crucible and inner wall of the chamber, said heating chamber embodying an outer wall and an inner wall spaced therefrom, said inner wall being of refractory material from the group consisting of alumina, thoria and zirconia that will remain substantially inert at glass-melting temperatures to which the furnace is adapted to be heated, a series of cylindrically arranged primary coils connectable to a source of electrical energy and having a tubular shaped secondary spaced interiorly thereof, said primary coils and secondary being disposed between the inner and outer walls of said chamber and being embedded in a granular refractory material of a composition similar to that of the inner wall of the heating chamber.

6. A glass melt furnace of the character described comprising a support for a glass-batch-containing crucible, an open-ended heating chamber removably positioned in spaced relation about said crucible and support to form an air chamber between the crucible and inner wall of the chamber, said air chamber communicating with the opposed open ends of said heating chamber, and means for lowering and raising said heating chamber from its position about said crucible and support, said heating chamber embodying an outer wall and an inner wall spaced therefrom, said inner wall being of refractory material from the group consisting of alumina, thoria and zirconia that will remain substantially inert at the temperatures to which the furnace is heated, a series of primary coils connectable to a source of electrical energy and having a secondary spaced interiorly thereof, said primary coils and secondary being disposed between the inner and outer walls of said chamber and being embedded in a granular refractory material of a composition similar to that of the inner wall of the heating chamber.

7. An electric induction type glass melting furnace such as described comprising a supporting receptacle for containing the glass batch to be heated, a carbon type secondary surrounding said receptacle and an outer surrounding series of primary coils connectable to a source of electrical energy, said secondary being disposed in the effective range of said primary coils for inductive heating by said primary coils and so as to radiantly transfer heat therefrom sufficiently to melt a glass batch when contained in said supporting receptacle, and insulating material from the group consisting of zirconia, thoria and alumina between the primary coils and the secondary and completely enclosing the secondary, said insulating material remaining substantially inert at the glass batch melting temperatures to which the carbon-type secondary radiantly heats the supporting receptacle and glass batch contained therein when the furnace is in use, said furnace having a surrounding open area disposed between the receptacle and said insulated secondary and having openings on opposed sides of said receptacle communicating with said open area about said receptacle.

LEE O. UPTON.

References Cited in the file of this patent

UNITED STATES PATENTS

| Number | Name | Date |
|---|---|---|
| 812,399 | Bottomley et al. | Feb. 13, 1906 |
| 1,601,523 | George | Sept. 28, 1926 |
| 1,689,369 | Tama | Oct. 30, 1928 |
| 1,752,887 | Chutter | Apr. 1, 1930 |
| 1,823,873 | Brace | Sept. 22, 1931 |
| 1,830,481 | Northrup | Nov. 3, 1931 |
| 1,859,680 | Neuhauss | May 24, 1932 |
| 2,034,721 | Howe | Mar. 24, 1936 |
| 2,038,627 | Badger | Apr. 28, 1936 |
| 2,101,675 | Ferguson | Dec. 7, 1937 |
| 2,186,718 | Ferguson | Jan. 9, 1940 |
| 2,252,756 | Byers | Aug. 19, 1941 |
| 2,266,002 | Clark | Dec. 16, 1941 |
| 2,286,481 | Fisher | June 16, 1942 |